(12) United States Patent
Deshmukh

(10) Patent No.: US 11,553,447 B2
(45) Date of Patent: Jan. 10, 2023

(54) REGISTERING AN ENDPOINT WITH MULTIPLE HEADEND SYSTEMS

(71) Applicant: Landis+Gyr Innovations, Inc., Alpharetta, GA (US)

(72) Inventor: Pushpesh Kumar Deshmukh, Alpharetta, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 6 days.

(21) Appl. No.: 16/902,844

(22) Filed: Jun. 16, 2020

(65) Prior Publication Data
US 2021/0392604 A1 Dec. 16, 2021

(51) Int. Cl.
| | |
|---|---|
| H04W 60/00 | (2009.01) |
| H04W 76/10 | (2018.01) |
| H04L 43/08 | (2022.01) |
| H04L 61/50 | (2022.01) |
| H04B 7/155 | (2006.01) |
| H04L 12/66 | (2006.01) |
| H04L 41/0806 | (2022.01) |
| H04L 61/5014 | (2022.01) |

(52) U.S. Cl.
CPC ............ *H04W 60/00* (2013.01); *H04B 7/155* (2013.01); *H04L 12/66* (2013.01); *H04L 41/0806* (2013.01); *H04L 43/08* (2013.01); *H04L 61/5014* (2022.05); *H04W 76/10* (2018.02)

(58) Field of Classification Search
None
See application file for complete search history.

(56) References Cited

U.S. PATENT DOCUMENTS

| | | | | |
|---|---|---|---|---|
| 2009/0079584 | A1* | 3/2009 | Grady | G01D 4/004 340/870.02 |
| 2012/0029710 | A1* | 2/2012 | Dodderi | H02J 13/00034 700/286 |

(Continued)

OTHER PUBLICATIONS

International Patent Application No. PCT/US2021/037060, International Search Report and Written Opinion dated Sep. 24, 2021, 11 pages.

*Primary Examiner* — Yemane Mesfin
*Assistant Examiner* — Jeff Banthrongsack
(74) *Attorney, Agent, or Firm* — Kilpatrick Townsend & Stockton LLP

(57) ABSTRACT

Techniques described herein register an endpoint device, such as a utility meter, with multiple headend systems. A system described herein includes a utility meter, which measures consumption of a resource, and a Network Management System (NMS) headend system, which manages a network. The utility meter joins the network and obtains an Internet Protocol (IP) address of the NMS headend system. The utility meter transmits a network registration request to the NMS headend system using the IP address of the NMS headend system and receives, from the NMS headend system, network-related settings of the network. The utility meter obtains an IP address of a second headend system configured to provide a service over the network. Further, the utility meter receives, from the second headend system, configuration settings for using the service of the second headend system and, as such, configures the radio with the network-related settings and the configuration settings.

17 Claims, 7 Drawing Sheets

(56) References Cited

U.S. PATENT DOCUMENTS

| | | | |
|---|---|---|---|
| 2012/0126790 A1* | 5/2012 | Sobotka | G08C 19/28 |
| | | | 324/119 |
| 2012/0246268 A1 | 9/2012 | Richeson et al. | |
| 2016/0019663 A1 | 1/2016 | Mani et al. | |
| 2016/0021525 A1* | 1/2016 | Mani | H04W 4/80 |
| | | | 455/434 |

* cited by examiner

REGISTERING AN ENDPOINT WITH MULTIPLE HEADEND SYSTEMS

TECHNICAL FIELD

Various implementations described herein relate to network endpoints, such as utility meters or other Internet-of-Things devices. More particularly, various implementations relate to registering an endpoint with multiple headend systems.

BACKGROUND

An endpoint is a device that operates at the end, or edge, of a network. For instance, consumer devices such as smartphones and personal computers are typically endpoints, as such a device is connected to a network and operated by a user, rather than merely acting as a gateway. A utility meter can also act as an endpoint that measures the consumption of a resource, and the endpoint can then communicate data describing such measurements to other devices in a network.

Conventionally, while acting as an endpoint, a utility meter is connected to a central system by way of a network. The central system acts as a headend system that manages services provided to the node. For instance, such services include network management, distribution automation, outage management, and metering services (i.e., services related to the measurement and reporting of resource consumption). The utility meter and the headend system communicate with each other to ensure that the utility meter behaves as indicated based on parameters associated with each service; for instance, the command center instructs the utility meter as to how and under what circumstances to report consumption, power outages, or other information.

SUMMARY

In one implementation, a system includes a Network Management System (NMS) headend system and a utility meter. The NMS headend system is configured to manage a network. The utility meter includes a radio and is configured to measure consumption of a resource. Further, the utility meter is configured to join the network and obtain an Internet Protocol (IP) address of the NMS headend system. The utility meter is configured to transmit a network registration request to the NMS headend system using the IP address of the NMS headend system and to receive from the NMS headend system network-related settings of the network. The utility meter is configured to obtain an IP address of a second headend system configured to provide a service over the network. The utility meter is further configured to receive from the second headend system configuration settings for using the service of the second headend system and to configure the radio with the network-related settings and the configuration settings.

In another implementation, a method is performed by a utility meter that measures consumption of a resource. The method includes joining a network and transmitting a registration request to a Network Management System (NMS) headend system of the network. In turn, the NMS headend system informs a second headend system of the registration request. The method further includes receiving from the NMS headend system network-related settings related to the network as well as configuration data related to the second headend system. The configuration data indicates an Internet Protocol (IP) address of the second headend system and indicates how to use a service of the second headend system. The method further includes configuring a radio of the utility meter according to the network-related settings and according to the configuration data of the second headend system. As a result, the utility meter is configured to communicate with the second headend system using the IP address of the second headend system to use a service of the second headend system.

In yet another implementation, a method is performed by a utility meter. The method includes joining a network and transmitting a first registration request to a Network Management System (NMS) headend system of the network. The method further includes receiving, from the NMS headend system and responsive to the first registration request, network-related settings related to the network. The method further includes obtaining an Internet Protocol (IP) address of a second headend system that provides a service over the network and transmitting a second registration request to the IP address of the second headend system. The method further includes receiving configuration data from the second headend system responsive to the second registration request. The configuration data indicates how to use the service of the second headend system. The method includes configuring a radio of the utility meter according to the network-related settings and according to the configuration data of the second headend system.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
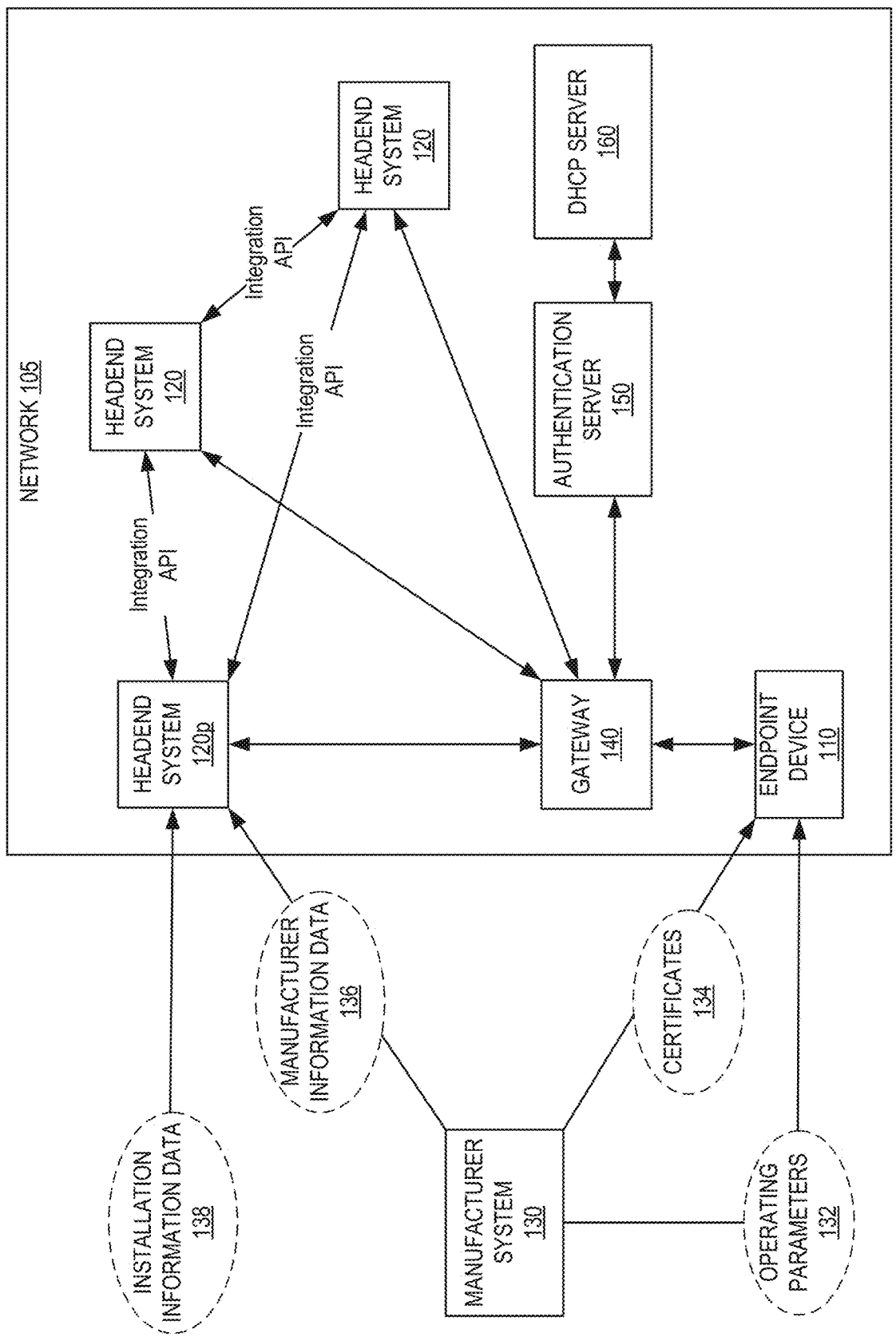
FIG. 1 is a diagram of a network in which an endpoint device utilizes the services of multiple headend systems, according to some implementations described herein.

It is desirable to enable interoperability between a utility meter and multiple headend systems that were provided by different vendors. In other words, rather than a single vendor providing all headend systems as well as a utility meter that will use those headend systems, multiple vendors may be involved, each associated with a respective headend system. This means that a utility service provider for a utility meter need not rely on a single manufacturer's proprietary solution for headend systems, because the utility meter could potentially utilize headend systems from various vendors. Further, the utility service provider can utilize the services of headend systems operated by other entities, regardless of which vendors are associated with those headend systems. For example, one or more of the following headend systems or others may be associated with a utility meter: a first entity may operate an advance metering infrastructure (AMI) headend system that came from a first vendor and is responsible for managing an integrated infrastructure of smart meters, a second entity may operate a network management system (NMS) headend system that came from a second vendor and is responsible for managing a network to which the utility meter is connected and through which the utility meter communicates, a third entity may be a distribution automation (DA) headend system that came from a third vendor and is responsible for tasks associated with automatically controlling physical devices to support network operations, and a fourth entity may be an outage management system (OMS) headend system that came from a fourth vendor and is responsible to managing and remediating outages across the network.

Conventionally, a utility meter is configured to communicate with a primary headend system, which manages various capabilities of the utility meter. When the utility meter uses the services of other headend systems not operated by the utility service provider, the utility meter is not able to communicate with those other headend systems, because other headend systems have their own proprietary processes and protocols not known by the utility meter. In one example, the primary headend system may functionally act as both an AMI headend system and an NMS headend system in combination, such that the primary headend system manages the metering infrastructure and also manages network communications. When a utility meter requires support from another headend system, other than the primary headend system, the utility meter accesses services of the other headend system through its associated primary headend system, because the utility meter is not configured to communicate with the other headend system or to utilize services of the other headend system. Thus, either a service provider is required to utilize a utility meter and headend systems of a single vendor, or the utility meter has to use the primary headend system as an intermediary, which increases network utilization and increases the workload on the primary headend system.

According to some implementations described herein, however, a utility meter is configured to register with various headend systems, potentially facilitated by the primary headend system. When the utility meter registers with a second headend system other than the primary headend system, the second headend system provides to the utility meter configuration data (i.e., parameters) for configuring the utility meter to utilize the services of the second headend system. This enables the utility meter to communicate with the second headend system, without using the primary headend system as an intermediary, to utilize the services of the second headend system.

Based on implementations described herein, an endpoint device can be interoperable with various headend systems and further can be expandable with capabilities supported by headend systems for which the endpoint device was not designed. In other words, the endpoint device is not limited a proprietary system for which the endpoint device was designed and is not limited by the proprietary systems of various headend systems. As such, a utility service provider or other provider of endpoint devices need not rely on a single vendor when establishing a network of endpoint devices and various other network nodes. Implementations described herein are suitable not only for utility networks, but also for networks associated with other Internet of Things (IoT) devices.

FIG. 1 is a diagram of a network 105 in which an endpoint device 110 utilizes the services of multiple headend systems 120 and thus has capabilities supported by multiple headend systems, according to some implementations described herein. An example of the endpoint device 110 is a utility meter, such as an electricity meter, water meter, or gas meter. However, the endpoint device 110 can be a device other than a utility meter, such as an IoT device other than a utility meter. The endpoint device 110 can utilize, and can thus be in communication with, two or more headend systems 120, each of which provides a corresponding service to the endpoint device 110. In some implementations, one of such headend systems 120 acts as a primary headend system 120p for the endpoint device 110. The primary headend system 120p may be, but need not be, involved in providing information to the endpoint device 110 or to the other headend systems 120, or both, to establish communications between the endpoint device 110 to enable the endpoint device 110 to utilize services of the other headend systems 120. In some implementations, the endpoint device 110 and the primary headend system 120p are associated with a single vendor or service provider, but this is not required.

As shown in FIG. 1, a manufacturer system 130 configures the endpoint device 110 and installs data on the endpoint device 110, such as code or other data enabling the endpoint device 110 to utilize services of certain headend systems 120. Specifically, in some implementations, the manufacturer system 130 installs operating parameters 132 and certificates 134 on the endpoint device 110. As described further below, the operating parameters 132 may include radio parameters and AMI initialization parameters, and the certificates may enable the endpoint device to authenticate itself during communications with other devices.

Additionally or alternatively to the above, in some implementations, the manufacturer system 130 transmits to the primary headend system 120p manufacturer information data 136. The primary headend system 120p may transmit part or all of the manufacturer information data 136 to the other headend systems 120, such as through an integration application programming interface (API), so that the other headend systems 120 can recognize the endpoint device 120. The manufacturer information data 136 describes the endpoint device 110, thus enabling the primary headend system 120p and the other headend systems 120 to recognize and interact with the endpoint device 110; for instance, the manufacturer information data 136 includes one or more of the following parameters: device type, shipping date, device serial number, initial reading on the device, accuracy class and form factor, or mode of operation.

The manufacturer system 130 can be, for instance, one or more devices under the authority of a manufacturer of the endpoint device 110 or another entity associated with the endpoint device 110. For instance, the manufacturer system 130 can include a machine that is operable by a technician or that is part of an assembly line, where that machine installs the operating parameters on the endpoint device 110. Additionally or alternatively, the manufacturer system 130 can include a server device that communicates with one or more headend systems 120 to provide the manufacturer information data 136. It will be understood that various implementations are possible for the manufacturer system 130.

Additionally or alternatively, in some implementations, after installation of the endpoint device 110, the primary headend system 120p receives installation information data 138, which describes the installation of the endpoint device 110. For instance, the installation information data 138 may include one or more of the following parameters: serial number of the endpoint device 110, user information (e.g., information about a user whose resource consumption will be measured by the endpoint device 110 if the endpoint device 110 is a utility meter) such as a user identifier, installation date and time, service location (e.g., in terms of longitude and latitude), service address, or device change-out information. In some implementations, when a field technician installs the endpoint device 110, the field technician submits part or all of the installation information data 138 based on the installation, such as through entry onto a field device that is in communication with the primary headend system 120p. The installation information data 138 is pushed to the primary headend system 120p based on this submission.

In some implementations, the endpoint device 110 is configured to be functionally expandable. In other words, as described in detail below, the endpoint device 110 is configured to register with a headend system 120 other than the primary headend system 120p. The endpoint device 110 can configure itself and, specifically, configure the radio of the endpoint device 110 to communicate data to the headend system 120 in accordance with configuration data (i.e., parameters) provided by the headend system 120. In other words, even if the endpoint device 110 is not manufactured for operability with a certain headend system 120, the endpoint device 110 can configure itself to operate with that certain headend system 120 as described in detail below.

As also shown in FIG. 1, an example of the endpoint device 110 communicates with other devices, such as the headend systems 120, through a gateway 140. In some implementations, the gateway acts as an intermediate node for the endpoint device, and possibly for other endpoint devices 110, such that the gateway 140 passes communications between the endpoint device 110 and other devices. More specifically, when the endpoint device 110 communicates with a headend system 120, the gateway 140 receives that communication from the endpoint device 110 and directs that communication to the headend system 120. Analogously, when a headend system 120 communicates with the endpoint device 110, the gateway 140 receives the communication and passes it to the endpoint device 110.

As shown in FIG. 1, an authentication server 150 may authenticate the endpoint device 110 to confirm that the endpoint device 110 is allowed to communicate over a network 105. In some implementations, the endpoint device 110 communicates with the headend systems 120 over that network 105. The network 105 may be one or more of various types; for instance, the network 105 may be a Wireless Smart Utility Network (Wi-SUN) network (e.g., a WiSUN field area network), a radio frequency (RF) mesh network (e.g., a GRIDSTREAM RF network or a GRID-STREAM RF IP network), another type of wireless mesh network, a low power long range (LoRa) network, a ZigBee network, or various other network types.

In some implementations, as shown in FIG. 1, a Dynamic Host Configuration Protocol (DHCP) server 160 assigns an internet protocol (IP) address to the endpoint device 110 for use on the network 105. For instance, the DHCP sever 160 may assign the IP address to the endpoint device 110 after authentication of the endpoint device by the authentication server 150. Further, in some implementations, the authentication server 150 contacts the DHCP server 160 for an IP address on behalf of the endpoint device 110 responsive to having authenticated the endpoint device 110. However, if the network does not require authentication, then the endpoint device 110 may contact the DHCP server 160 without going through an authentication server 150.

In some implementations, the endpoint device 110 is a DHCPv6 client, and the gateway 140 is a DHCPv6 relay configured to relay messages (i.e., communications) for the endpoint device 110. Further, the authentication server 150 may be a FreeRADIUS AAA server that provides authentication, authorization, and accounting (AAA) for the network 105. However, it will be understood that various implementations are within the scope of this disclosure.

Figure 2:
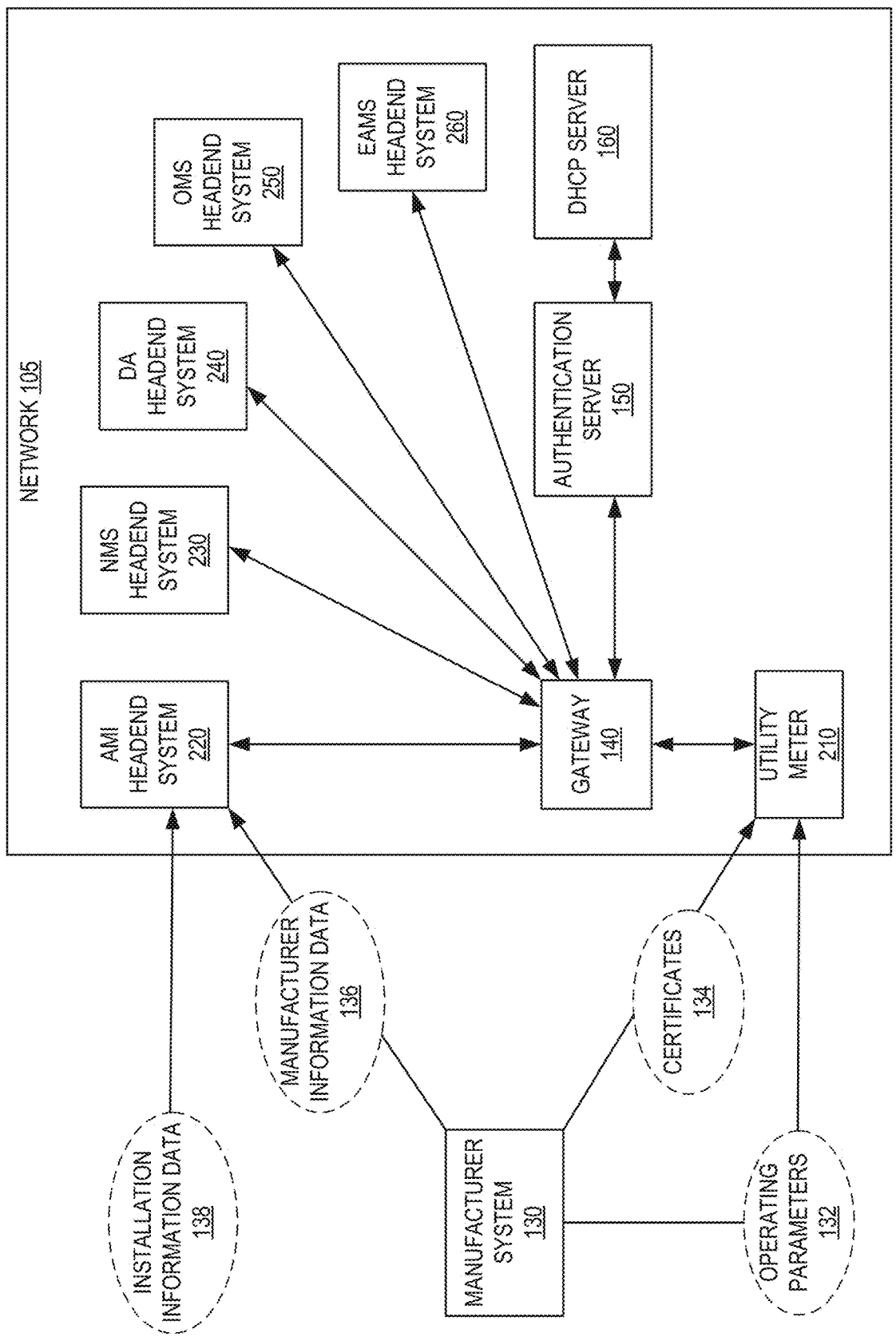
FIG. 2 is a diagram of an example network in which an endpoint device, specifically a utility meter, utilizes the services of multiple headend systems, according to some implementations described herein.

FIG. 2 is a diagram of an example network 105 in which an endpoint device 110, specifically a utility meter 210, utilizes the services of multiple headend systems 120, according to some implementations. Specifically, FIG. 2 illustrates an example of the more general environment shown in FIG. 1, where the endpoint device 110 is a utility meter 210 utilizing the services of specific headend systems 120. In this example, the utility meter 210 utilizes services of the following headend systems 120: an Advanced Metering Infrastructure (AMI) headend system 220, a Network Management System (NMS) headend system 230, a Distribution Automation (DA) headend system 240, an Outage Management System (OMS) headend system 250, and an Edge Application Management Solution (EAMS) headend system 260. Although communications through the integration API between headend systems 120 are not shown in FIG. 2, such communications can be performed in this example as well.

In this example, the AMI headend system 220 acts as a primary headend system 120p, which facilitates establishing a relationship between the endpoint device 110 and the other headend systems. An example AMI headend system 220 communicates with the endpoint device 110 about consumption data (e.g., measurements of the amount of a resource consumed) when the endpoint device 110 is a utility meter; for instance, the endpoint device 110 transmits consumption data to the AMI headend system, where the consumption data is arranged based on time intervals according to specifications of the AMI headend system 220.

Some implementations enable the endpoint device 110 to utilize the services of headend systems 120 other than the primary headend system 120p and to do so according to parameters set by such headend systems 120. In this example, such other headend systems 120 include the NMS headend system 230, the OMS headend system 250, and the EAMS headend system 260. An example NMS headend system 230 manages the health of the network 105 over which the endpoint device 110 and other devices communicate; for instance, the NMS headend system maintains information about how nodes of the network 105 are connected to one another and the respective signal strengths of such connections, including connections of the endpoint device 110. An example DA headend system 240 manages the collection and analysis of data to automatically monitor and control physical systems (e.g., electrical and mechanical systems) in a smart grid, such as an electrical power grid, of which the endpoint device 110 is a part. An example OMS headend system 250 collects information about outages across connected devices such as the endpoint device 110. An example EAMS headend system manages edge computing to potentially decentralize some tasks occurring on the network 105. It will be understood that the utility meter can utilize the services of these or other headend systems 120 and that the example of FIG. 2 is provided for illustrative purposes only.

Figure 4:
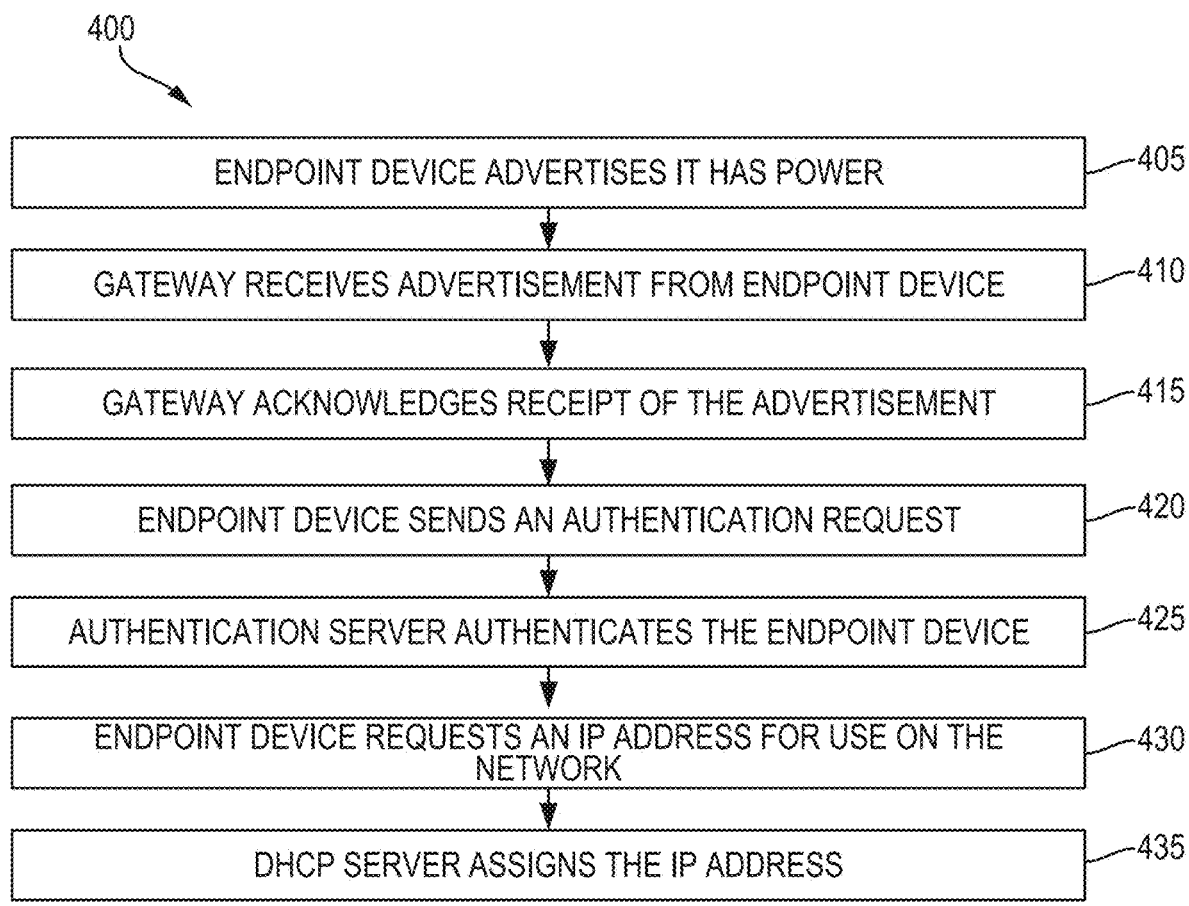
FIG. 4 is a diagram of a method of joining an endpoint device to a network, according to some implementations described herein.
Figure 5:
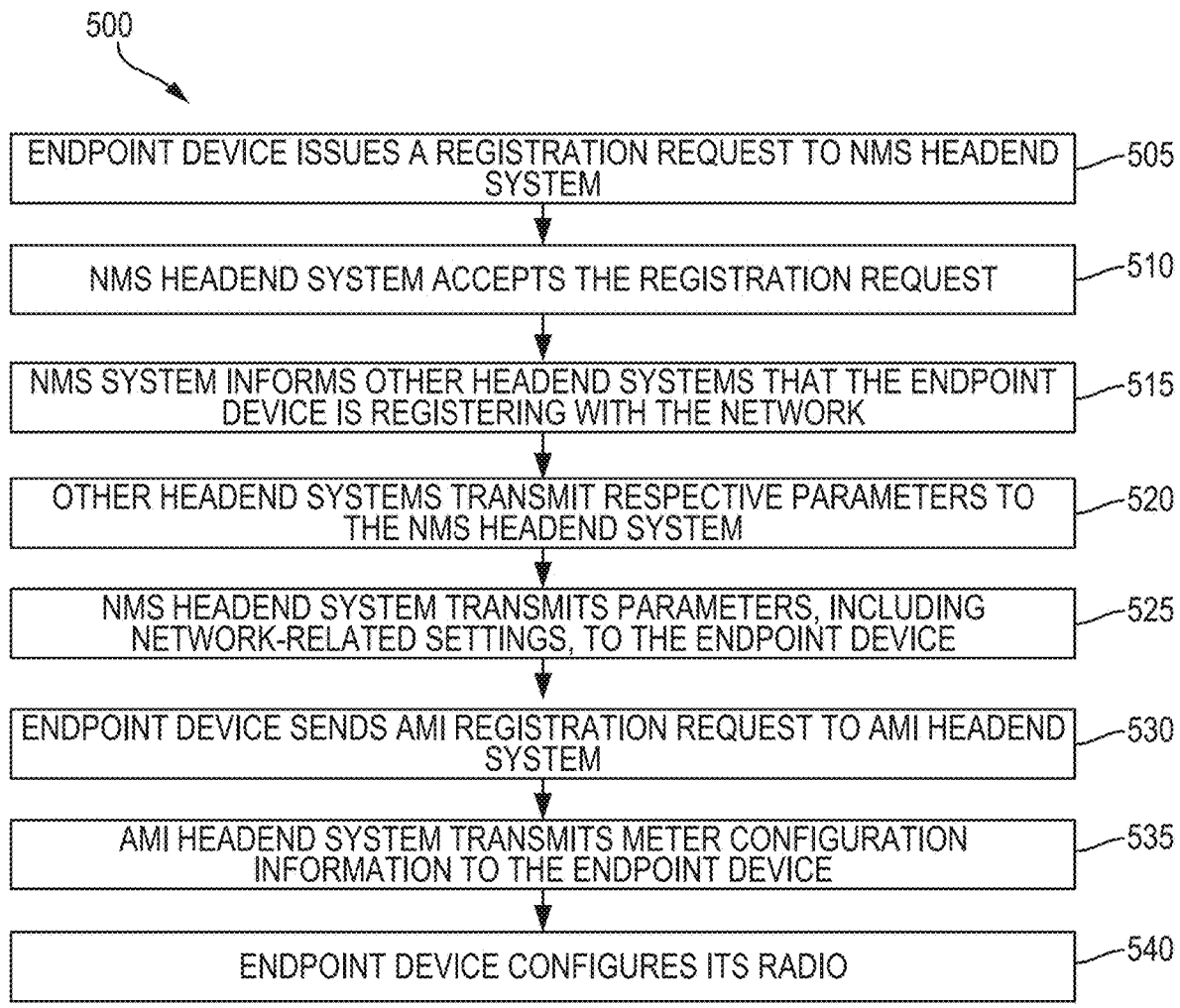
FIG. 5 is a diagram of a method of registering the endpoint device to the network, according to some implementations described herein.
Figure 6:
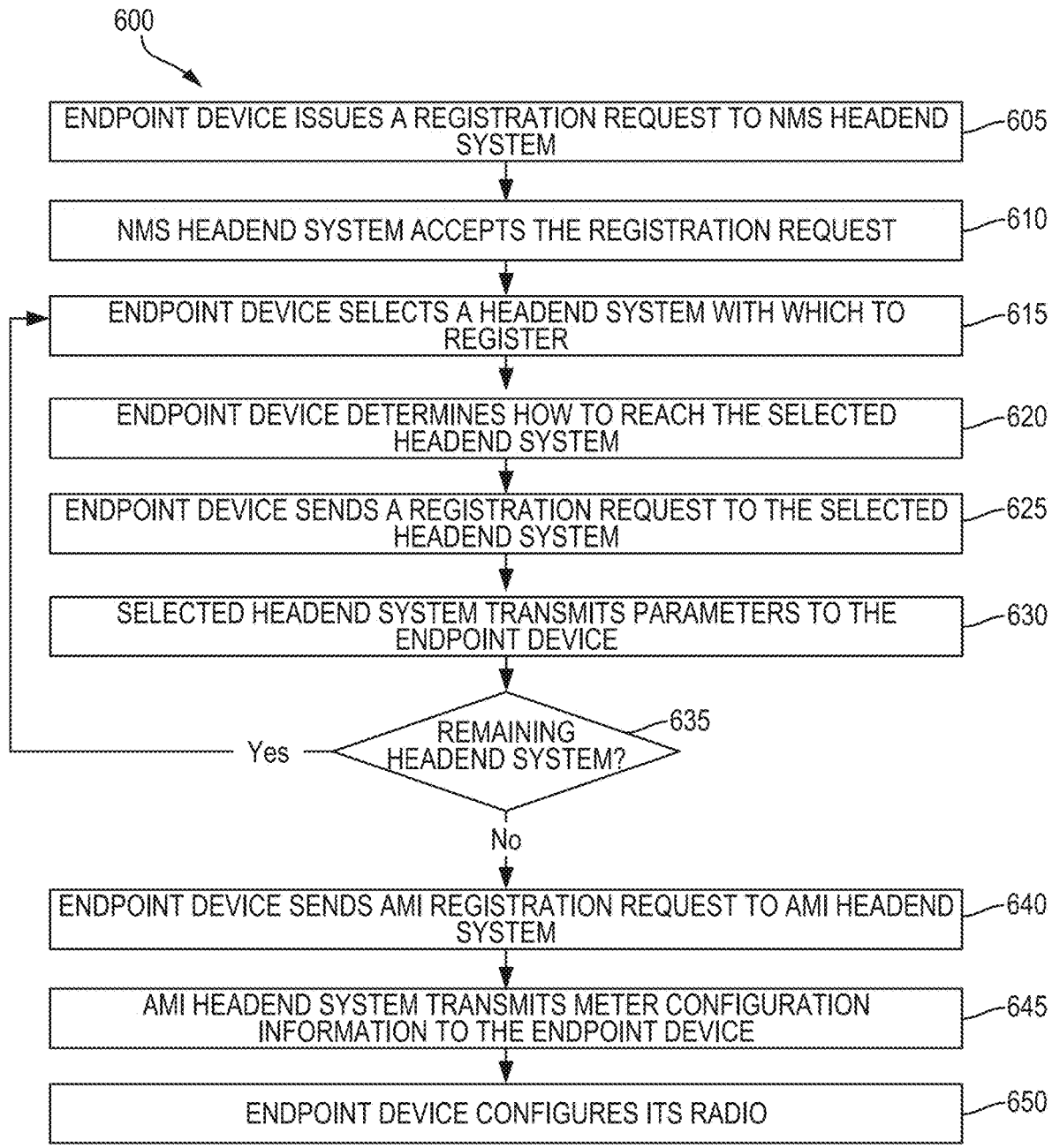
FIG. 6 is another diagram of a method of registering the endpoint device to the network, according to some implementations described herein.

In contrast to a conventional configuration, in which a utility meter 210 communicates with only a single headend system 120, some implementations of the endpoint device 110 described herein communicate with various headend systems 120 without utilizing a primary headend system 120p as an intermediary. In some implementations, establishing communications between the endpoint device 110 and each headend system 120 involves the following: initializing the endpoint device 110 as shown in FIG. 3; joining the endpoint device 110 to a network 105 as shown in FIG. 4; and registering the endpoint device 110 with the network 105 and, specifically, with various headend systems 120 as shown in FIG. 5 and FIG. 6.

Figure 3:
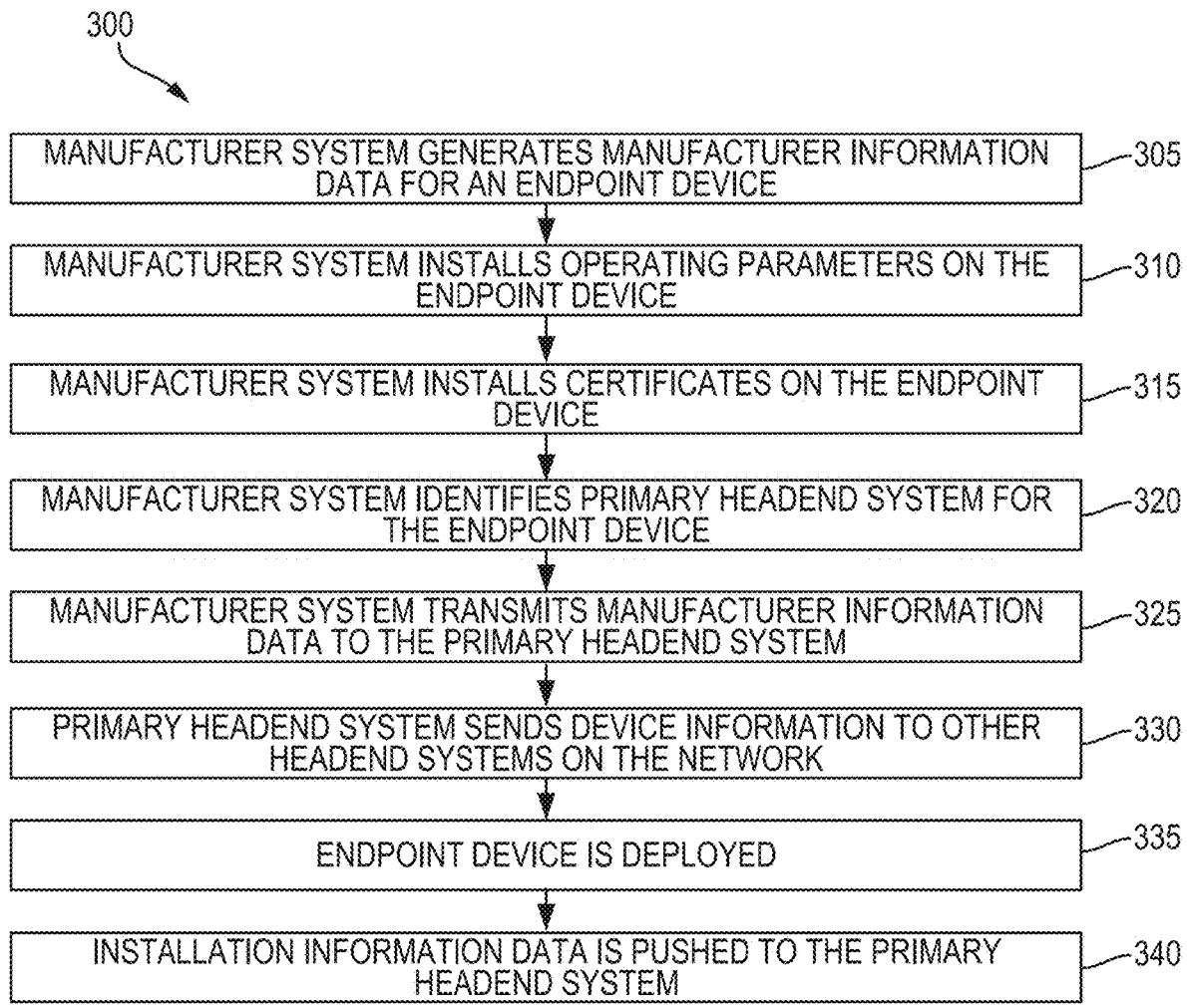
FIG. 3 is a diagram of a method of initializing an endpoint device, according to some implementations described herein described herein.

FIG. 3 is a diagram of a method 300 of initializing an endpoint device 110, according to some implementations described herein. An example of such a method 300 involves various activities leading up to and including deployment of the endpoint device 110. In some implementations, this method 300 or similar is performed by a combination of a manufacturer, such as by way of the manufacturer system 130, and a primary headend system 120p. In contrast to conventional systems, however, as described below, the endpoint device 110 can communicate with other headend systems 120 in addition to its primary headend system 120p.

As shown in FIG. 3, at block 305, the manufacturer system 130 generates manufacturer information data 136, which describes the endpoint device 110. In some implementations, because the manufacturer system 130 is associated with the manufacturer of the endpoint device 110, the manufacturer system 130 has the data needed to generate the manufacturer information data 136. In one example, the manufacturer information data 136 includes one or more of the following: manufacturer identifier (e.g., name of the manufacturer), serial number, customer information (e.g., a name or other identifier of a utility service provider if the endpoint device 110 is a utility meter 210), shipping date, initial reading (e.g., if the endpoint device 110 is a utility meter 210), accuracy class, or form factor. In some implementations, the manufacturer information data 136 additionally or alternatively identifies which headend systems 120 are intended to be used by the endpoint device 110.

At block 310, the manufacturer system 130 installs a set of operating parameters 132, such as radio parameters and AMI initialization parameters, on the endpoint device 110. In some implementations, the operating parameters were determined during the manufacturing or assembly process for the endpoint device 110 or asynchronously by the customer (e.g., a utility service provider). The operating parameters indicate aspects of how the endpoint device operates. For instance, the radio parameters may include a network identifier, a radio power level, a country code, or a Daylight Saving Time (DST) flag. In some implementations, the radio parameters also provide communication protocols for headend systems 120 whose services the endpoint device 110 is capable of utilizing; however, this is not required as such protocols can be provided during network registration. The AMI initialization parameters may include parameters describing tasks of the endpoint device 110 with respect to an advanced metering infrastructure. The AMI initialization parameters may include, for example, one or more energy parameter and one or more programs for the meter to execute. In some implementations, the AMI initialization parameters additionally describe a communication protocol for communicating with an AMI headend system 220.

At block 315, the manufacturer system 130 installs on the endpoint device 110 a set of certificates 134, which are useable by the endpoint device 110 to verify the authenticity of the endpoint device 110. For instance, the endpoint device 110 sends an applicable certificate along with a communication to verify that the endpoint device 110 is the authentic source of the communication; for instance, the endpoint device 110 may sign the communication with the certificate. The certificates installed on the endpoint device 110 may include one or more of the following: a server root certificate, an endpoint root certificate, an endpoint birth certificate, or an HES certificate 134.

In some implementations, the various certificates 134 enable the endpoint device to authenticate itself during communications. For example, when communicating over the network 105, the endpoint device 110 may transmit a certificate as part of such communication; the endpoint device 110 may use the certificate 134 to sign a message in the communication, for instance. The endpoint birth certificate may use a public key infrastructure (PKI) of the manufacturer of the endpoint device 110. The endpoint birth certificate may be immutable and, in some implementations, is used for bootstrapping, specifically, to authenticate the endpoint device 110 during bootup. The server root certificate and the endpoint root certificate may be managed by the PKI of a utility service provider when the endpoint device 110 acts as a utility meter 210. The endpoint root certificate may be enrolled on, and therefore based on, the endpoint birth certificate and used for enrolling the server root certificate, and the server root certificate may be an operational certificate used for 802.1X authentication on the network 105. An application layer of the endpoint device 110 may use the HES certificate to communicate with the headend systems 120. It will be understood that these specific certificates 134 are listed for illustrative purposes only and that the endpoint device 110 may include a combination of these or other certificates 134.

As described above, the manufacturer system 130 need not be a single device. Thus, the device of the manufacturer system 130 that installs operating parameters 132 and the certificates 134 may differ from the device that generates or transmits the manufacturer information data 136.

At block 320, the manufacturer system 130 identifies the primary headend system 120p for the endpoint device 110. Identifying the primary headend system 120p may occur in various ways. In some implementations, for example, the manufacturer system 130 is aware of customer-specific requirements of the endpoint device 110 as well as the capabilities of the endpoint device 110, and the manufacturer system 130 is equipped to determine which headend system 120 will act as the primary headend system 120p for the endpoint device 110 based on such customer-specific requirements or capabilities. In one example, the customer-specific requirements known to the manufacturer system 130 indicate which headend system 120 is the primary headend system 120p, and thus, the manufacturer system 130 identifies that headend system 120 as the primary headend system 120p. This may be a headend system 120 owned or operated by the customer itself, for example. In some implementations, two or more headend systems 120 will act as the primary headend system 120p for the endpoint device 110, and in that case, the manufacturer system 130 identifies each such primary headend system 120p.

At block 325, the manufacturer system 130 transmits the manufacturer information data 136 to the primary headend system 120p identified at block 320. If there are two or more primary headend systems 120, then in some implementations, the manufacturer system 130 transmits the manufacturer information data 136 to each primary headend system 120p identified at block 320. As a result, the primary headend system 120p has access to information in the manufacturer information data 136, indicating manufacturing parameters of the endpoint device 110.

At block 330, the primary headend system 120p communicates device information about the endpoint device 110 to other headend systems 120 that will support the endpoint device 110. For instance, as shown in FIG. 1, each headend system 120 implements an integration API, through which the headend systems 120 can communication with one another. Through the integration API, the primary headend system 120p communicates device information about the endpoint device 110 to each of the other headend systems 120. For instance, such device information may include the manufacturer information data 136, or the device information transmitted to a headend system 120 may include select information that the primary headend system 120p determines is relevant to the services provided by the headend system 120. In some implementations, the primary headend system 120p transmits device information to each headend system 120 in communication with the primary headend system 120p (e.g., to each headend system 120 on the network 105; alternatively, however, the primary headend system 120p transmits the device information only to a subset of headend systems whose services the endpoint device 110 will utilize, based on indications in the manufacturer information data 136. As such, each headend system 120 that will support the endpoint device 110 now has information about the endpoint device 110 and can thus recognize the endpoint device 110 when the endpoint device 110 comes online.

At block 335, the endpoint device 110 is deployed in the field. More specifically, for instance, a technician installs the endpoint device 110 at a location where the endpoint will operate. If the endpoint device 110 is a utility meter 210, the endpoint device 110 is installed at or near a premises such that the endpoint device 110 can measure the consumption of a resource on that premises.

At block 340, installation information data 138 is pushed to the primary headend system 120p, wherein installation information data 138 describes information related to the installation of the endpoint device 110. For instance, when the technician installs the endpoint device 110 at block 335, the technician submits information, such as through a portable field device, describing the installation of the endpoint device. This information is communicated over one or more networks to the primary headend system 120p. The installation information data 138 includes, for instance, one or more of the following: customer information (e.g., an identifier of a utility service provider that acts as the customer), installation date and time, serial number of the endpoint device 110, service location, service address, user information such as a user identifier (e.g., of a user utilizing services of the utility service provider), or device change-out information. As such, in some implementations, the primary headend system 120p now has both manufacturer information data 136 and installation information data 138 describing characteristics of the endpoint device 110.

FIG. 4 is a diagram of a method 400 in which the endpoint device 110 joins a network 105, according to some implementations. In some implementations, after deployment of the endpoint device 110, this method 400 or similar is performed by a combination of the endpoint device 110, a gateway 140, an authentication server 150, and a DHCP server 160 to ensure that the endpoint device 110 can communicate over the network 105.

As shown in FIG. 4, at block 405, the endpoint device 110 advertises that it is powered on. For example, the endpoint device 110 may broadcast a signal indicating that the endpoint device 110 is powered on. In some implementations, various nodes of a network 105 are listening for such broadcasts.

Thus, at block 410, a gateway 140 receives the advertisement. In some cases, the gateway 140 may hear the advertisement directly. Additionally or alternatively, however, some other node in the network 105 may hear the advertisement; for instance, another endpoint device may hear the advertisement. In that case, the other node forwards the advertisement to the gateway 140. Generally, an example of the gateway 140 acts as an intermediary that passes messages from the endpoint device 110 to other nodes in the network 105 and that passes messages from other nodes to the endpoint device 110.

In some implementations, the endpoint device 110 communicates directly with the gateway 140. Alternatively, however, the endpoint device 110 communicates with the gateway 140 through one or more other nodes, which route messages between the endpoint device 110 and the gateway 140. Thus, it will be understood that when this disclosure refers to communications between the endpoint device 110 and the gateway, such communications can be routed through one or more other nodes. If the endpoint device 110 is a utility meter 210, the gateway 140 may be a collector configured to collect consumption data from the endpoint device 110 as well as from other utility meters 210 for which the gateway 140 is acting as a collector.

Additionally or alternatively to the activities described with respect to blocks 405 and 410, for instance in the case where the endpoint device 110 is a utility meter 210 and the network 105 is an RF mesh network, the endpoint device 110 may listen for a beacon upon being powered on. A beacon is an administrative packet distributed throughout the network 105 to maintain channel synchronization among radios. In some implementations, upon receiving the beacon, the endpoint device 110 advertises itself to the device from which the endpoint device 110 received the beacon. For instance, that device either is itself the gateway 140 or forwards the advertisement to the gateway 140.

In some implementations, in these early communications that occur prior to registration with the network 105, the endpoint device 110 may use one or more default radio parameters, such as a default communication protocol, that have been predefined. For instance, such radio parameters were included in the operating parameters 132 provided by the manufacturer system 130. Later, the endpoint device 110 may be configured to use other radio parameters, which may vary across the headend systems 120.

At block 415, the gateway 140 acknowledges receipt of the advertisement that the endpoint device 110 is powered on. For instance, in some implementations, the gateway 140 sends a message over the network 105 to the endpoint device 110, where the message acknowledges receipt of the advertisement sent by the endpoint device 110 in block 405.

At block 420, based on the acknowledgement, the endpoint device 110 sends an authentication request to request network authentication. The gateway 140 may receive the authentication request sent by the endpoint device 110 at block 420 and may transmit the authentication request to an authentication server 150 associated with the network 105.

At block 425, the authentication server 150 authenticates the endpoint device 110. Specifically, in some implementations, the authentication server 150 receives the authentication request from the endpoint device 110, which may have been transmitted by way of the gateway 140. The authentication request may include data sufficient to enable the authentication server 150 to verify that the endpoint device 110 belongs on the network 105. For instance, as mentioned above, the endpoint device 110 may have signed the authentication request with a certificate 134, and in that case, the authentication server 150 may verify the certificate 134. Based on authenticating the endpoint device 110, the authentication server 150 may transmit an indication of authentication back to the endpoint device 110, and in some implementations, that indication of authentication is routed through the gateway 140.

Although not shown in FIG. 4, in some cases, the authentication server 150 may be unable to authorize the endpoint device 110. This may be the case, for instance, if the endpoint device 110 has reached a gateway 140 for a network other than the network 105 the endpoint device 110 was attempting to join. In that case, the authentication server 150 transmits to the endpoint device 110 an indication of a failure to authenticate. Responsive to this indication, the endpoint device 110 may disconnect from the gateway 140, and the method 400 may return to block 405, in which the endpoint device 110 once again advertises that it is powered on, in an attempt to connect with a gateway 140 for its intended network 105.

At block 430, the endpoint device 110 requests an Internet Protocol (IP) address for use on the network 105. In some implementations, the gateway 140 receives the request for the IP address and forwards that request to the authentication server 150, which forwards the request to a DHCP server 160 associated with the network 105.

At block 435, upon receiving the request for the IP address, the DHCP server 160 assigns an IP address to the endpoint device 110. In some implementations, the DHCP server 160 transmits the IP address to the authentication server 150, which transmits the IP address back to the endpoint, such as by way of the gateway 140. After receiving the IP address, the endpoint device 110 uses the IP address to identify itself when communicating over the network 105.

In some implementations, the network 105 does not require authentication. For instance, the need for authentication may be based on the communication standards being used in the network 105. For example, when the network 105 is an RF mesh network using a proprietary communication protocol, authentication is not requested because use of the proprietary communication protocol sufficiently authenticates the endpoint device 110 with respect to use of the network 105. However, for another example, an RF mesh IP network or a Wi-SUN network may require authentication as described in the respective specifications for those network types. However, regardless of whether authentication is required according to the communication standards of the network 105, authentication can be used to provide a layer of network security. If authentication is not used, however, the method 400 skips blocks 420 and 425, and the endpoint device 110 requests an IP address from the DHCP server 160 without using the authentication server 150 as an intermediary. For instance, the gateway 140 routes the endpoint device's request for an IP address to the DHCP server 160, rather than to an authentication server 150.

After performance of this method 400 or similar, the endpoint device 110 is deemed joined to the network 105. However, the endpoint device 110 is not yet registered with the network 105 or, more specifically, with the various headend systems 120 that will support the endpoint device 110.

FIG. 5 is a diagram of a method 500 of registering the endpoint device 110 to the network 105, according to some implementations. Specifically, in this disclosure, registering with the network 105 refers to registering with headend systems 120 to be used by the endpoint device 110, thus enabling the endpoint device 110 to access the services of the headend systems 120 over the network 105. Through network registration, the endpoint device 110 presents itself to the various headend systems 120, which provide the endpoint device 110 with parameters, if any, needed to utilize the respective services of the headend systems 120.

As shown in FIG. 5, at block 505, the endpoint device 110 issues a registration request to the NMS headend system. In some implementations, the gateway 140 already knows how to reach the NMS headend system 230, and the gateway 140 receives the registration request and forwards the registration request the NMS headend system 230. For instance, the registration request includes one or more registration packets that include information identifying the endpoint device 110. The identifying information may include, for instance, the serial number of the endpoint device 110 or of a radio of the endpoint device 110. The endpoint device 110 may repeatedly send the registration request until a response is received from the NMS headend system 230.

In some implementations, the NMS headend system 230 receives the registration request, and at block 510, the NMS headend system 230 accepts the registration request. In some implementations, due to having received information about the endpoint device 110 during the initialization of the endpoint device, as described above and shown in the example of FIG. 3, the NMS headend system 230 is expecting to receive a registration request from this particular endpoint device 110. Thus, upon receiving the registration request, the NMS headend system 230 recognizes the endpoint device, based on comparing the registration request to the device information previously received, and therefore accepts the registration request.

At block 515, the NMS headend system 230 informs the other headend systems 120 that the endpoint device 110 is attempting to register with the network 105. In one example, based on the manufacturer information data 136 previously received by the NMS headend system 230, the NMS headend system 230 knows which other headend systems 120 will provide services to the endpoint device 110, and in that case, the NMS headend system 230 may inform only those other headend systems 120. Alternatively, however, the NMS headend system 230 may inform every headend system 120 with which the NMS headend system 230 can communicate or may use some other selection technique to determine which headend systems 120 to inform. As described above, each headend system 120 may implement an integration API enabling the headend systems 120 to communicate with one another. Using the integration API, the NMS headend system 230 may inform the other headend systems 120 that the endpoint device 110 is attempting registration.

At block 520, based on being informed by the NMS headend system 230, one or more of (e.g., all of) the headend systems 120 that were informed in block 515 of the registration request may transmit to the NMS headend system 230 an indication of their respective parameters. Generally, the parameters associated with a headend system 120 indicate to the endpoint device 110 how or what data to communicate with the headend system 120 to utilize the services of the headend system 120. As described above, the endpoint device 110 need not be designed to operate with the headend systems 120, as may be the case if a headend system 120 is operated by a different vendor than is the endpoint device 110. For instance, the endpoint device 110 may follow the American National Standards Institute (ANSI), Device Language Message Specification (DLMS), and Associação Brasileira de Normas Técnicas (ABNT) data standards by default and may communicate using Wi-SUN and IEEE by default, such as in the case when the endpoint device 110 is a utility meter 210. However, each vendor that develops an endpoint device 110 or headend system 100 has the freedom to use other data standards or network standards, and those standards may be based on various considerations, including historical usage by that vendor, customer requirements, geographic location, or local regulations. The parameters associated with a headend system 120 provide enough information to the endpoint device 110 to enable the endpoint device 110 to configure itself (e.g., to configure its radio) to operate with that headend system 120.

For instance, an example of the DA headend system 240 transmits to the NMS headend system 230 DA parameters including, for instance, an IP address of the DA headend system 240 and an indication of what information the DA headend system 240 would like the endpoint device 110 to provide to the DA headend system 240 to enable the DA headend system 240 to automate physical aspects of the network. More specifically, in some implementations, the endpoint device 110 includes one or more sensors for detecting physical properties of the network 105, and the DA parameters may indicate which data is to be detected by such sensors and transmitted to the DA headend system 240. An example of the OMS headend system 250 transmits to the NMS headend system 230 OMS parameters including an IP address of the OMS headend system 250 and, for instance, an indication of how and when to report outages experienced or detected by the endpoint device 110. An example of the EAMS headend system 260 transmits to the NMS headend system 230 EAMS parameters including an IP address of the EAMS headend system 260 and, for instance, an indication which data the endpoint device 110 should provide to the EAMS headend system 260 and when that data should be provided.

In some implementations, a headend system 120 utilizes a communication protocol that differs from another communication protocol utilized by the endpoint device 110. A communication protocol may define, for instance, which radio band is used for a transmission or how a communication packet is structured. Without knowing the communication protocol of a headend system 120, an endpoint device 110 cannot read communications from the headend system 120 and cannot transmit a message to the headend system 120 that is readable by the headend system 120. For instance, in one example, the endpoint device 110 may have a default communication protocol associated with its vendor, while the headend system 120 may use a different communication protocol associated with its respective vendor. More specifically, in another example, the endpoint device 110 communicates over an RF mesh network at 900 MHz to reach the AMI headend system 220 and the NMS headend system 230, but the endpoint device 110 may be required to communication over a ZigBee or Wireless Fidelity (WiFi) network to reach another headend system 120. In some implementations, the parameters associated with the headend system 120 indicate a communication network or radio band to use as part of the respective communication protocol for that headend system 120.

In one example, the manufacturer system 130 was aware of which headend systems 120 the endpoint device 110 would use and had access to the communication protocols of such headend systems, and the manufacturer system 130 installed on the endpoint device necessary hardware or software for implementing such communication protocols during initialization of the endpoint device 110. In that case, the endpoint device 110 is already configured to use a communication protocol of a headend system 120 other than the primary headend system 120p. In another example, however, the endpoint device 110 does not use have access to a communication protocol needed to communicate with a headend system 120 whose services it will use. In the latter case, the respective parameters transmitted by that headend system 120 may describe the communication protocol to be used in communications with that headend system 120.

In some implementations, the NMS headend system 230 may receive the parameters transmitted from the other headend systems 120, and at block 525, the NMS headend system 230 transmits to the endpoint device 110 the parameters associated with the various headend systems 120. In some implementations, the gateway 140 receives the parameters from the NMS headend system 230 and forwards the parameters to the endpoint device 110. The parameters may include parameters associated with each of the other headend systems 120 providing services for the endpoint device 110 as well as NMS parameters associated with the NMS headend system 230 itself, where those NMS parameters are network-related settings.

Generally, the NMS headend system 230 manages the health of one or more networks 105 used by the endpoint device 110. For example, the endpoint device 110 communicates with the AMI headend system 220, the NMS headend system 230, potentially other headend systems 120, the gateway 140, or other endpoint devices 110 over an RF mesh network or other network 105, whose health is managed by the NMS headend system 230. The NMS headend system 230 may be concerned with network-related data, such as neighbor signal strengths (e.g., the strengths of signals between devices in direct communication with each other over the network 105), radio event statistics, other radio information, or network node maintenance schedules. In some implementations, the NMS headend system 230 maintains network-related data, for instance, in one or more database tables. The NMS headend system 230 may occasionally generate reports describing the network 105; such reports can be used by the utility service provider or by a utility service customer to determine the health of the network 105. To this end, the NMS parameters may include, for instance, an indication of when the endpoint device 110 should send information about network events (e.g., every hour) or how frequently the endpoint device 110 should send its neighbor signal strength.

In some implementations, during operation, the endpoint device 110 thus maintains a list of its neighbors (e.g., devices with which the endpoint device 110 can communicate directly) in the network 105 and, further, maintains a respective indication of the signal strength of communications with each neighbor. From time to time, such as periodically, the endpoint device 110 updates its indications of the signal strengths of its neighbors based on changes, if any, to such signal strengths. According to the NMS parameters, the endpoint device 110 transmits indications of such signal strengths to the NMS headend system 230 from time to time. Upon receiving such information from the endpoint device 110 during operation of the endpoint device 110, the NMS headend system 230 may store the information for later use.

In some embodiments, the NMS parameters also include group configuration settings for the endpoint device 110. In some cases, messages from the NMS headend system 230 or another headend system 120 may be directed to endpoint devices 110 within a group. Group configuration settings can inform the endpoint device 110 of its group membership, thereby enabling the endpoint device 110 to configure its radio for communications related to the group membership.

At block 530, if the endpoint device 110 is acting as a utility meter 210 that has AMI capability, the endpoint device 110 sends an AMI registration request to the AMI headend system 220. In some implementations, the gateway 140 receives the AMI registration request from the endpoint device 110 and forwards the AMI registration request to the AMI headend system 220. The gateway 140 may already have the IP address of the AMI headend system 220 because, in some implementations, the gateway 140 acts as a collector for the AMI headend system 220. The AMI registration request may include meter information of the endpoint device 110. For instance, the meter information may indicate a serial number, meter program information, meter classification, load profile configuration, midnight configuration, time-of-use setting, time zone, DST capability, or supported event information. This meter information can enable the AMI headend system 220 to recognize the endpoint device 110 and to decide how to configure the endpoint device 110 (i.e., to decide what AMI parameters to provide). In some implementations, the endpoint device 110 repeatedly sends the AMI registration request until a response is received from the AMI headend system 220.

In some implementations, the AMI headend system 220 receives the AMI registration request and, at block 535, transmits back to the endpoint device 110 meter configuration information. As described above, as part of the initialization of the endpoint device 110, the AMI headend system 220 received device information about the endpoint device 110, which indicated that the AMI headend system 220 should expect registration from the endpoint device 110. Thus, upon receiving the AMI registration request, the AMI headend system 220 can confirm the authenticity of the endpoint device by comparing the device information received previously with the meter information included in the AMI registration request. Having confirmed the authenticity of the endpoint device 110, the AMI headend system 220 may configure the endpoint device 110 by returning AMI parameters (i.e., AMI registration parameters) and, specifically, meter configuration information to the endpoint device 110.

In some implementations, the endpoint device 110 was programmed with information about the AMI headend system 220 during manufacturing or at some other point prior to deployment, such as at block 310 of the method 300 for initializing the endpoint device 110. However, in some implementations, the programming of this information did not register the endpoint device 110 with the AMI headend system 220 and, thus, did not provide to the endpoint device 110 with specifics as to what data to send to the AMI headend system 220 and when to send that data. The meter configuration information in the AMI parameters transmitted by the AMI headend system 220 during registration includes, for example, the frequency and manner in which the endpoint device 110 should communicate consumption data, night data (i.e., consumption data recorded at midnight), load profile data, billing data, meter statistics, or other information to the AMI headend system. In some implementations, the gateway 140 receives the meter configuration information from the AMI headend system 220 and forwards the meter configuration information to the endpoint device 110.

At block 540, upon receipt of the various parameters transmitted to the endpoint device 110 at block 525 as well as the meter configuration information transmitted at block 535, the endpoint device 110 configures itself to communicate with the various headend systems 120 as indicated in the parameters associated with the headend systems 120 and as indicated in the meter configuration information. For instance, in some implementations, the endpoint device 110 configures its radio to send certain data at certain times in accordance with the various parameters received. As such, the endpoint device 110 is configured to communicate directly with each headend system 120, according to its respective parameters, to utilize the services of that headend system 120. Further, in some implementations, the endpoint device 110 need not communicate with a headend system 120 through an intermediary, such as through the primary headend system 120$p$, but rather can address each headend system 120 by its IP address using the applicable communication protocols of that headend system 120.

FIG. 6 is another diagram of a method 600 of registering the endpoint device 110 to the network 105, according to some implementations. Specifically, the example method 600 of FIG. 6 illustrates an alternative to the method 500 described above and shown in FIG. 5 for registering the endpoint device 110 with headend systems 120, thus enabling the endpoint device 110 to access the services of the headend systems 120 over the network 105.

As shown in FIG. 6, at block 605, the endpoint device 110 issues a registration request to the NMS headend system. In some implementations, the gateway 140 already knows how to reach the NMS headend system 230, and the gateway 140 receives the registration request and forwards the registration request to the NMS headend system 230. For instance, the registration request includes one or more registration packets that include information identifying the endpoint device 110. The identifying information may include, for instance, the serial number of the endpoint device 110 or of a radio of the endpoint device 110. The endpoint device 110 may repeatedly send the registration request until a response is received from the NMS headend system 230.

In some implementations, the NMS headend system 230 receives the registration request, and at block 610, the NMS headend system 230 accepts the registration request and returns NMS parameters to the endpoint device 110. The NMS parameters may be network-related settings. In some implementations, due to having received information about the endpoint device 110 during the initialization of the endpoint device, as described above and shown in the example of FIG. 3, the NMS headend system 230 is expecting to receive a registration request from this particular endpoint device 110. Thus, upon receiving the registration request, the NMS headend system 230 recognizes the endpoint device, based on comparing the registration request to the device information previously received, and therefore accepts the registration request. The NMS parameters may include, for instance, an indication of when the endpoint device 110 should send information about network events (e.g., every hour) or how frequently the endpoint device 110 should send its neighbor signal strength.

In some implementations, the NMS headend system 230 additional transmits to the endpoint device 110 information about the other headend systems 120 to be used by the endpoint device 110. For instance, the device information received by the NMS headend system 230 during initialization of the endpoint device 110 may indicate which headend systems 120 the endpoint device 110 will use. In that case, the NMS headend system 230 may transmit to the endpoint device 110 an indication of each respective IP address and communication protocol of each such headend system 120, thereby enabling the endpoint device to reach and communicate with each headend system 120 that the endpoint device 110 will use.

Block 615 begins an iterative loop in which the endpoint device 110 registers with a particular headend system 120 of the network 105. At block 615, the endpoint device 110 selects a headend system 120 whose services the endpoint device 110 will utilize. For instance, the endpoint device 110 may be programmed (e.g., by the manufacturer system 130) with a list of headend systems 120 whose services to use. Additionally or alternatively, the NMS headend system 230 may identify the headend systems 120 to be used by the endpoint device 110 based on the device information received by the headend system 120, and as such the NMS headend system 230 may indicate which headend systems 120 the endpoint device 110 should use.

At block 620, the endpoint device 110 determines how to reach the selected headend system 120, which was selected at block 615 above. For instance, the endpoint device 110 may be programmed with an IP address of the selected headend system 120. Additionally or alternatively, the gateway 140 or the NMS headend system 230, as described above, may indicate the IP address to the endpoint device 110.

At block 625, the endpoint device 110 sends a registration request to the selected headend system 120, for instance, by directing the registration request to the IP address determined at block 620. The registration request may include one or more registration packets identifying the endpoint device 110 and requesting use of the services of the headend system 120. Additionally, the endpoint device 110 may utilize the respective communication protocol of the selected headend system 120 when constructing the registration request. In some implementations, the gateway 140 receives the registration request and forwards the registration request to the selected headend system 120. The endpoint device 110 may repeatedly send the registration request until a response is received from the selected headend system 120.

In some implementations, the selected headend system 120 receives the registration request. The selected headend system 120 accepts the registration of the endpoint device 110 and, at block 630, responds by transmitting parameters describing how the endpoint device 110 should behave with respect to the selected headend system 120. As described above, the specific parameters received may depend on the purpose of the selected headend system 120. For instance, if the selected headend system 120 is a DA headend system 240, then the DA headend system transmits DA parameters including, for instance, an indication of what information the DA headend system 240 would like the endpoint device 110 to provide to the DA headend system 240 to enable the DA headend system 240 to automate physical aspects of the network. If the selected headend system 120 is an OMS headend system 250, then the OMS headend system 250 transmits OMS parameters including, for instance, an indication of how and when to report outages experienced or detected by the endpoint device 110. If the selected headend system 120 is an EAMS headend system 260, then the EAMS headend system 260 transmits EAMS parameters including, for instance, an indication which data the endpoint device 110 should provide to the EAMS headend system 260 and when that data should be provided.

At decision block 635, the endpoint device 110 determines whether any headend systems 120 remain whose services the endpoint device 110 will use and with which the endpoint device 110 has not yet registered. If such a headend system 120 remains, then the method 600 returns to block 615, where the endpoint device 110 will select another headend system 120. Otherwise, no such headend system 120 remains, and the method 600 proceeds to block 640.

At block 640, if the endpoint device 110 is acting as a utility meter 210 that has AMI capability, the endpoint device 110 sends an AMI registration request to the AMI headend system 220. In some implementations, the gateway 140 receives the AMI registration request from the endpoint device 110 and forwards the AMI registration request to the AMI headend system 220. The gateway 140 may already have the IP address of the AMI headend system 220 because, in some implementations, the gateway 140 acts as a collector for the AMI headend system 220. The AMI registration request may include meter information of the endpoint device 110. For instance, the meter information may indicate a location identifier (e.g., an installation address) or a serial number, by which the AMI headend system 220 can recognize the endpoint device 110. In some implementations, the endpoint device 110 repeatedly sends the AMI registration request until a response is received from the AMI headend system 220.

At block 645, the AMI headend system 220 receives the AMI registration request and transmits back to the endpoint device 110 meter configuration information. As described above, as part of the initialization of the endpoint device 110, the AMI headend system 220 received device information about the endpoint device 110, which indicated that the AMI headend system 220 should expect registration from the endpoint device 110. Thus, upon receiving the AMI registration request, the AMI headend system 220 can confirm the authenticity of the endpoint device by comparing the device information received previously with the meter information included in the AMI registration request. Having confirmed the authenticity of the endpoint device 110, the AMI headend system 220 may configure the endpoint device 110 by returning AMI parameters and, specifically, meter configuration information to the endpoint device 110. The meter configuration information includes, for example, the frequency and manner in which the endpoint device 110 should communicate consumption data to the AMI headend system. In some implementations, the gateway 140 receives the meter configuration information from the AMI headend system 220 and forwards the meter configuration information to the endpoint device 110.

At block 650, upon receipt of the various parameters transmitted to the endpoint device 110 at block 630 as well as the meter configuration information transmitted at block 645, the endpoint device 110 configures itself to communicate with the various headend systems 120 as indicated in the parameters associated with the headend systems 120 and as indicated in the meter configuration information. For instance, the endpoint device 110 configures its radio to communicate with the various headend system 120 as indicated in the parameters. As such, the endpoint device 110 is configured to communicate directly with each headend system 120, according to its respective parameters, to utilize the services of that headend system 120. Further, in some implementations, the endpoint device 110 need not communicate with a headend system 120 through an intermediary, such as through the primary headend system 120p, but rather can address each headend system 120 by its IP address using the applicable communication protocols of that headend system 120.

Figure 7:
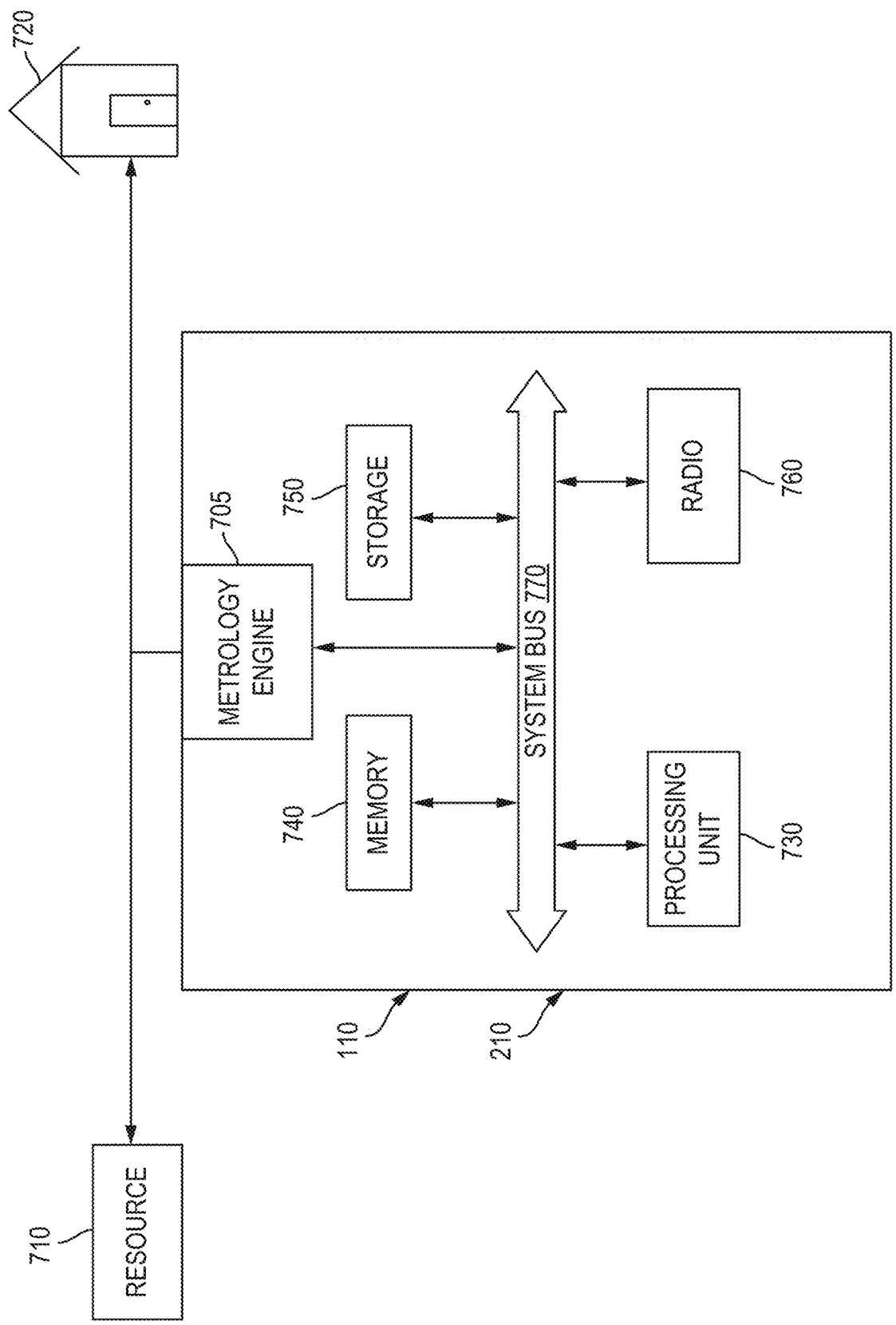
FIG. 7 is a diagram of an endpoint device, specifically a utility meter, according to some implementations described herein.

FIG. 7 is a diagram of an endpoint device 110, specifically a utility meter 210, according to some implementations described herein. For instance, the utility meter 210 may be a water meter, a gas meter, or another type of meter that measures consumption of a resource 710. A utility meter 210 such as that shown may act as an endpoint device 110 configured to utilize multiple headend systems 120 as described herein. More specifically, for instance, the utility meter 210 reports consumption data, which describes the consumption of the resource 710 according to established time intervals, to the AMI headend system 220 in some implementations. Additionally, the utility meter may utilize other headend systems 120 by communicating with such other headend systems 120 as indicated by the respective parameters associated with each headend system 120. Although this disclosure refers to implementations described herein being embodied in a utility meter 210, it will be understood by one skilled in the art that implementations are not limited to utility meters 210. Rather, for instance, an endpoint device 110 may be an IoT device or some other computing device.

As shown in FIG. 7, an example utility meter 210 measures consumption of a resource 710 occurring on a premises 720. To this end, the utility meter 210 may include a metrology engine 705, which detects a signal indicating use of the resource 710 and, based on that signal, determines use of the resource 710 on the premises 720. The utility meter 210 may further include a processing unit 730, a volatile memory 740, a nonvolatile storage 750, and a communication device such as a radio 760. For instance, the utility meter 210 may configure the radio 760 based on parameters received from the headend systems 120 and may thus use the radio 760 to communicate data to the headend systems 120 according to such parameters. The processing unit 730, the volatile memory 740, the nonvolatile storage 750, and the radio 760 may be in communication with one another and with the metrology engine 705 by way of a system bus 770. Although the processing unit 730, the volatile memory 740, and the nonvolatile storage 750 are shown and described herein as being distinct components, it will be understood that this distinction is for illustrative purposes only and does not limit the scope of this disclosure. For instance, the processing unit 730, the volatile memory 740, and the nonvolatile storage 750 may be integrated together into a single chip, such as a microcontroller unit.

In some implementations, the operations of an endpoint device 110 described herein, such as joining and registering with the network 105, communicating with the headend systems 120, configuring the radio 760, and utilizing services of the headend systems 120, are embodied as program instructions stored in a computer-readable medium, such as the nonvolatile storage 740 or the volatile memory 750 of the utility meter 210. In some implementations, the computer-readable medium is a non-transitory computer-readable medium. The processing unit 730 may execute the program instructions to implement operations as described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system comprising:
   a Network Management System (NMS) headend system configured to manage a network; and
   a utility meter comprising a radio and configured to measure consumption of a resource, wherein:
   the utility meter is configured to join the network;
   the utility meter is configured to obtain an Internet Protocol (IP) address of a first headend system, being the NMS headend system, to communicate with the first headend system;
   the utility meter is configured to transmit a network registration request to the NMS headend system using the IP address of the NMS headend system;
   the utility meter is configured to receive from the NMS headend system network-related settings of the network;
   the utility meter is configured to obtain an IP address of a second headend system to communicate with the second headend system, wherein the second headend system is configured to provide a service over the network;

the utility meter is configured to receive configuration data for using the service of the second headend system; and the utility meter is configured to configure the radio according to the network-related settings and the configuration data of the second headend system to enable the utility meter to communicate with two or more headend systems to utilize services of the two or more headend system, wherein the utility meter sends a first communication to the IP address of the first headend system, in lieu of sending the first communication to the NMS headend system, when utilizing a service of first headend system and sends a second communication to the IP address of the second headend system, in lieu of sending the second communication to the NMS headend system, when utilizing the service of the second headend system.

2. The system of claim 1, further comprising a gateway configured to relay communications from the utility meter to each of the NMS headend system and the second headend system.

3. The system of claim 2, wherein the second headend system is an Advanced Metering Infrastructure (AMI) headend system, and wherein the gateway is a collector configured to:

collect from the utility meter consumption data describing consumption of the resource; and transmit the consumption data to the AMI headend system.

4. The system of claim 2, wherein the gateway notifies the utility meter of the IP address of the second headend system.

5. The system of claim 1, wherein the second headend system is at least one of an Outage Management System (OMS) headend system, a Distribution Automation (DA) headend system, or an Edge Application Management System (EAMS) headend system.

6. The system of claim 1, wherein:

the NMS headend system informs the second headend system of the network registration request from the utility meter;

the second headend system transmits the configuration data to the NMS headend system; and the NMS headend system transmits the configuration data to the utility meter, wherein the configuration data enables the utility meter to utilize the service of the second headend system over the network without routing a communication for the service through the NMS headend system.

7. The system of claim 1, wherein:

the utility meter transmits a second registration request to the second headend system using the IP address of the second headend system;

the second headend system transmits the configuration data to the utility meter responsive to the second registration request; and the configuration data enables the utility meter to utilize the service of the second headend system over the network without routing a communication for the service through the NMS headend system.

8. The system of claim 1, wherein the utility meter communicates with the NMS headend system using a first communication protocol and communicates with the second headend system using a second communication protocol.

9. The system of claim 8, wherein the second communication protocol uses at least one of a different network or a different radio band than does the first communication protocol.

10. The system of claim 8, wherein the NMS headend system informs the utility meter of the second communication protocol of the second headend system.

11. A method performed by a utility meter that measures consumption of a resource, the method comprising:

joining, by the utility meter, a network, wherein the utility meter is configured to communicate with a first headend system, being a Network Management System (NMS) headend system of the network;

transmitting, by the utility meter, a registration request to the NMS headend system of the network, wherein the NMS headend system informs a second headend system of the registration request;

receiving, by the utility meter, from the NMS headend system network-related settings related to the network and configuration data related to the second headend system, wherein the configuration data indicates an Internet Protocol (IP) address of the second headend system and indicates how to use a service of the second headend system; and configuring, by the utility meter, a radio of the utility meter according to the network-related settings and according to the configuration data of the second headend system to enable the utility meter to communicate with two or more headend systems to utilize the services of the two or more headend systems, wherein the utility meter sends a first communication to an IP address of the first headend system, in lieu of sending the first communication to the NMS headend system, when utilizing a service of the first headend system and sends a second communication to the IP address of the second headend system, in lieu of sending the second communication to the NMS headend system, when utilizing the service of the second headend system.

12. The method of claim 11, further comprising:

receiving the IP address of the NMS headend system from a gateway, wherein the gateway relays communications for the utility meter;

wherein the gateway is a collector of consumption data from two or more utility meters, and wherein the consumption data describes consumption of the resource measured by the two or more utility meters.

13. The method of claim 11, further comprising communicating with the NMS headend system using a first communication protocol and communicating with the second headend system using a second communication protocol.

14. The method of claim 13, wherein the configuration data received from the NMS headend system indicates the second communication protocol for use with the second headend system.

15. A method performed by a utility meter, the method comprising:

joining, by the utility meter, a network, wherein the utility meter is configured to communicate with a first headend system, being a Network Management System (NMS) headend system of the network;

transmitting, by the utility meter, a first registration request to the headend system of the network;

receiving, by the utility meter, from the NMS headend system network-related settings related to the network, responsive to the first registration request;

that provides a service over the network;

transmitting, by the utility meter, a second registration request to the IP address of the second headend system;

receiving, by the utility meter, configuration data from the second headend system, wherein the configuration data indicates how to use the service of the second headend system, responsive to the second registration request; and configuring, by the utility meter, a radio of the utility meter according to the network-related settings and according to the configuration data of the second headend system to enable the utility meter to communicate with two or more headend systems to utilize the services of the two or more headend systems, wherein the utility meter sends a first communication to an IP address of the first headend system, in lieu of sending the first communication to the NMS headend system, when utilizing a service of the first headend system and sends a second communication to the IP address of the second headend system, in lieu of sending the second communication to the NMS headend system, when utilizing the service of the second headend system.

16. The method of claim 15, wherein obtaining the IP address of the second headend system comprises receiving the IP address of the second headend system from at least one of the NMS headend system or a gateway configured to relay messages for the utility meter.

17. The method of claim 15, wherein transmitting the first registration request to the NMS headend system comprises using a first communication protocol associated with the NMS, and wherein transmitting the second registration request to the second headend system comprises using a second communication protocol associated with the second headend system.

* * * * *